US012730687B1

(12) United States Patent
Arumugam et al.

(10) Patent No.: US 12,730,687 B1
(45) Date of Patent: Sep. 8, 2026

(54) CONTEXT-AWARE DATA INTERMEDIARY

(71) Applicant: NATIONWIDE MUTUAL INSURANCE COMPANY, Columbus, OH (US)

(72) Inventors: Senthyl Prabu Arumugam, Columbus, OH (US); Andrew Baumann, Columbus, OH (US); Christopher Beal, Columbus, OH (US); David Boldizar, Columbus, OH (US); Jeffery W. Cain, Columbus, OH (US); Andrew S. Zimmer, Columbus, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 296 days.

(21) Appl. No.: 17/377,532

(22) Filed: Jul. 16, 2021

Related U.S. Application Data

(60) Provisional application No. 63/053,140, filed on Jul. 17, 2020.

(51) Int. Cl.
*G06F 9/54* (2006.01)
*G06F 16/25* (2019.01)

(52) U.S. Cl.
CPC ............ *G06F 9/541* (2013.01); *G06F 16/258* (2019.01)

(58) Field of Classification Search
None
See application file for complete search history.

(56) References Cited

U.S. PATENT DOCUMENTS 6,233,709 B1 * 5/2001 Zhang ................... H04L 1/0051 714/794
6,466,931 B1 * 10/2002 Attaluri ............. G06F 16/24524 707/999.005
10,853,352 B1 * 12/2020 Fedderly ............. G06F 16/2428
11,044,298 B1 * 6/2021 Balasubrahmanian ..................... H04W 4/50
11,361,349 B1 * 6/2022 Smith ................ G06Q 30/0201
2009/0043621 A1 * 2/2009 Kershaw .......... G06Q 10/06398 705/7.17
2009/0049524 A1 * 2/2009 Farrell .................. H04L 63/105 726/4
2013/0080641 A1 * 3/2013 Lui ......................... H04L 47/70 709/226
2014/0012856 A1 * 1/2014 Abdelrahman ...... G06Q 10/087 707/740
2018/0329702 A1 * 11/2018 Eberlein ................... G06F 8/60
2018/0349433 A1 * 12/2018 Baines .................. G06F 16/258
2019/0079688 A1 * 3/2019 Ishihara ................ G06F 3/0653
2020/0145435 A1 * 5/2020 Chiu ....................... G06F 18/23

* cited by examiner

*Primary Examiner* — Umut Onat
(74) *Attorney, Agent, or Firm* — Thomas E. Lees, LLC

(57) ABSTRACT

A process for converting backend-agnostic data comprises exposing an application programming interface to a frontend and receiving backend-agnostic data via the frontend. Further, the process comprises determining a context for the backend-agnostic data and converting the backend-agnostic data from frontend status to backend status based on the context. The converted data is sent to the backend, and a set of recommendations is received from the backend, which are sent to the frontend. A selection of a recommendation from the set of recommendations is received, and an instrument from the selection is created.

20 Claims, 3 Drawing Sheets

CONTEXT-AWARE DATA INTERMEDIARY

CROSS REFERENCE TO RELATED APPLICATIONS

This application claims the benefit of U.S. Provisional Patent Application Ser. No. 63/053,140, filed Jul. 17, 2020, entitled "CONTEXT-AWARE DATA INTERMEDIARY", the disclosure of which is hereby incorporated by reference.

BACKGROUND

Various aspects of the present invention relate generally data conversion and specifically to context-aware data conversion to offload other applications.

When requesting an instruments, a user (i.e., sender of information) may use a application to send data to a server for creation of the instrument or to modify an existing instrument. The backend receives the data and creates an instrument based on that data.

BRIEF SUMMARY

According to aspects of the present invention, processes and systems for converting backend-agnostic data comprise exposing an application programming interface to a frontend and receiving backend-agnostic data via the frontend. Further, the process comprises determining a context for the backend-agnostic data and converting the backend-agnostic data from frontend status to backend status based on the context. The converted data is sent to the backend, and a set of recommendations is received from the backend, which are sent to the frontend. A selection of a recommendation from the set of recommendations is received, and an instrument from the selection is created.

DETAILED DESCRIPTION

A process for converting backend-agnostic data from a front end is disclosed. An intermediary between a frontend and a backend determines a context for backend-agnostic data from the frontend to be sent to the backend. Using the context, the intermediary converts the backend-agnostic data to a format that the backend can read. The backend then processes the context-formatted data and delivers recommendations back to the intermediary. After receiving a selection of one of the recommendations, an instrument is created from the selection. Thus, the frontend and the backend can be agnostic to each other and still interact. Further, parameters can be passed using the context of the data, as discussed in greater detail below.

Figure 1:
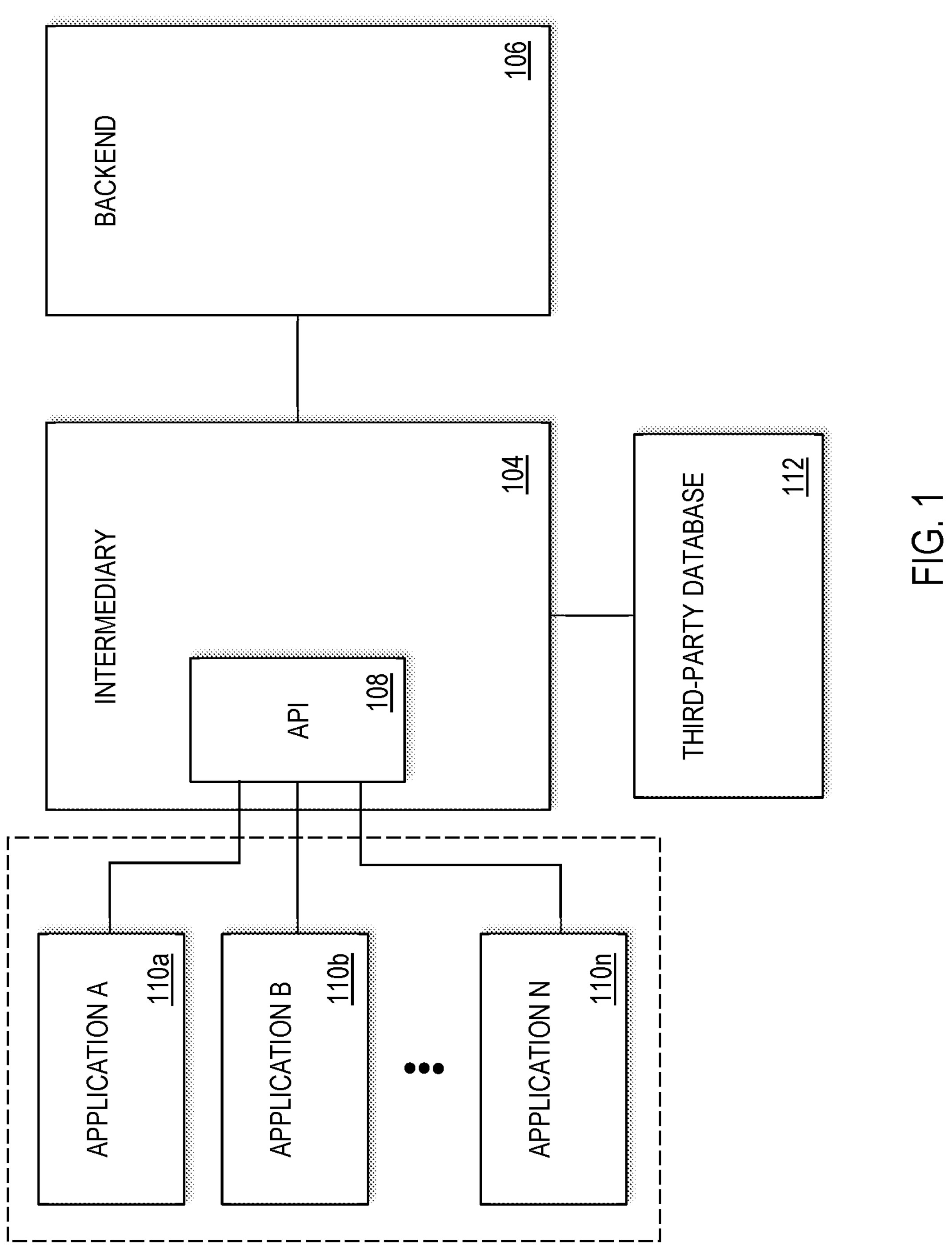
FIG. 1 is a block diagram for a system for converting backend-agnostic data, according to aspects of the present disclosure.

Turning to FIG. 1, a block diagram illustrates a system 100 for converting backend-agnostic data from a frontend 102 includes an intermediary 104 that couples the frontend

102 to a backend 106. The intermediary 104 includes an application programming interface 108 (API) that is compatible with the frontend 104. In some embodiments, the frontend includes several different applications 110*a-n* (collectively 110) that may want access to the backend 106. For example, a frontend application 110*a* may be a public website application. As another example, a frontend application 110*b* may be a private application running on a piece of dedicated equipment (e.g., an application associated with a car manufacturer running on the car itself) for senders (e.g., users, agents, etc.) to access the backend 106. When there is more than one frontend application 110, then the API 108 may have exposed interfaces for each application 110. The API may be in any desired form (e.g., REST (representational state transfer) architectural style).

The applications 110 on the frontend 102 send data for the backend 106 via the intermediary 104. Thus, the data sent from the frontend 102 can be backend-agnostic data. In other words, the data can be sent by the frontend 102 in any form (e.g., all at once, piecemeal, a few parameters at a time, parameter names that do not match backed parameter names, etc.). For example, if the frontend application 110 is a web-based application via a user interface, the data may be sent as a sender fills out forms or on a page-by-page basis. As another example, if the frontend application 110 is an in-vehicle application that has access to all data to be sent, then the data may be sent in one large payload (of course still being divided up into multiple data packets to comply with Internet data transmission protocols).

However, a context for the data should be included somewhere within the data (or metadata) sent from the frontend 102. For example, the context may be a parameter in a header associated with the data sent from the front end (e.g., whether the sender is associated with the application (e.g., an agent), whether the sender is a user, whether the data is to come piecemeal, whether the data is to come all at once, etc.). As another example, the context may be in the data itself instead of the header for the data. The context may also be sent and stored from a previous transmission of data from the frontend 102.

After determining the context, the intermediary 104 converts the backend-agnostic data from a frontend status (i.e., frontend-readable data) to backend status (i.e., backend-readable data) based on the context. For example, if the context indicates that the sender of the frontend application 110 that sent the data is an agent, then the backend-agnostic data received from the frontend application 110 is converted to backend status based on the sender being an agent. In some embodiments, the backend 106 requires certain parameters to have data in a certain range or to be populated with a value (e.g., numeric, a string, etc.). In the following example, the backend 106 requires that there be a maximum value for an insurance policy coverage to be $100,000 in a particular state or jurisdiction. If the context indicates that a is not an agent, and if this coverage value is missing, the intermediary 104 could assign a default value of $50,000 if there is no requested value for coverage amount. If context indicated that the sender is an agent, the intermediary 104 could default to an initial value of $75,000 (i.e., higher than the non-agent default value but less than the maximum value), because the agent has performed another task such as requesting underwriting that takes into account based on loss control, inspection or other favorable risk characteristics. Further, if the context indicates that the sender is not an agent and if the coverage is initially requested at $125,000 which exceeds the maximum value allowed for that coverage value in a particular state or jurisdiction, the intermediary 104 will correct it to a maximum of $100,000 value thereby increasing fault tolerance of the system interaction and providing a successful insurance quote with premium and no error. If a requested value is changed, then an explanation may be provided to the sender as to why the requested value was changed.

As another example, if the context indicates that the backend-agnostic data from the frontend application 110 is a portion of a piecemeal transmission, then the intermediary may convert the data to backend status by saving the data until a larger portion or all of the piecemeal transmission is received and then sending the larger/complete piecemeal transmission to the backend. The portions of the piecemeal transmission may be received in any order, and the intermediary can order the data properly for the backend during conversion. On the other hand, if the context indicates that the backend-agnostic data is a complete transmission (i.e., a single data payload), then that single data payload is passed to the backend 106.

As discussed above, the backend-agnostic data received from the frontend application 110 may be missing data values for parameters required by the backend 106. When converting the backend-agnostic data from frontend status to backend status, the intermediary 104 can automatically populate a value for the parameter, as discussed in the example above. Alternatively or in conjunction with, the intermediary 104 may request the data value for the parameter from a third party database 112. For example, if the parameter missing a data value is year that a vehicle was manufactured, then the intermediary 104 may send a vehicle identification number associated with the vehicle to the third-party database 112, and the third-party database 112 will respond with the manufacturing date of the vehicle. As another example, the intermediary 104 may also retrieve default data values from a third-party database such as state requirements for minimum coverage on an insurance policy.

Further, the intermediary can supply or retrieve default values for data that is outside a certain range. For example, the backend 106 requires that there be a minimum value be $55,000 in a particular state or jurisdiction, and if a user requests $40,000, then the value will be overridden with the default ($55,000 in this case) for the user to preview. As with the missing data, default data values for values that are determined to be out of range may be supplied by the intermediary directly, the backend, third-party database(s), or combinations thereof.

Once the backend-agnostic data has been converted to backend status, the converted data is sent to the backend 106. The backend 106 then works on the data and returns a set of recommendations to the intermediary 104. The intermediary 104 then converts the set of recommendations to a format that the frontend 102 can comprehend and sends the converted set of recommendations to the frontend 102. The person (e.g., an agent, a user, etc.) associated with the frontend application 110 makes a selection and the selection is sent to the intermediary 104. The intermediary 104 then creates an instrument (e.g., a policy) based on the selection, the set of recommendations, and the received data (the received backend-agnostic data, the converted data, or both).

Thus, the intermediary 104 uses the context from the backend-agnostic data to create an instrument without the frontend 102 knowing how to interact with the backend 106. Thus, if the interface of the backed 106 changes, then the only thing that needs to be updated is the intermediary 104, and the frontend applications 110 can remain untouched and still communicate with the backend through the intermediary. Further, if data is missing or out of range for one or more parameters required by the backend, then the intermediary 104 can provide default or specific values based on the context.

Figure 2:
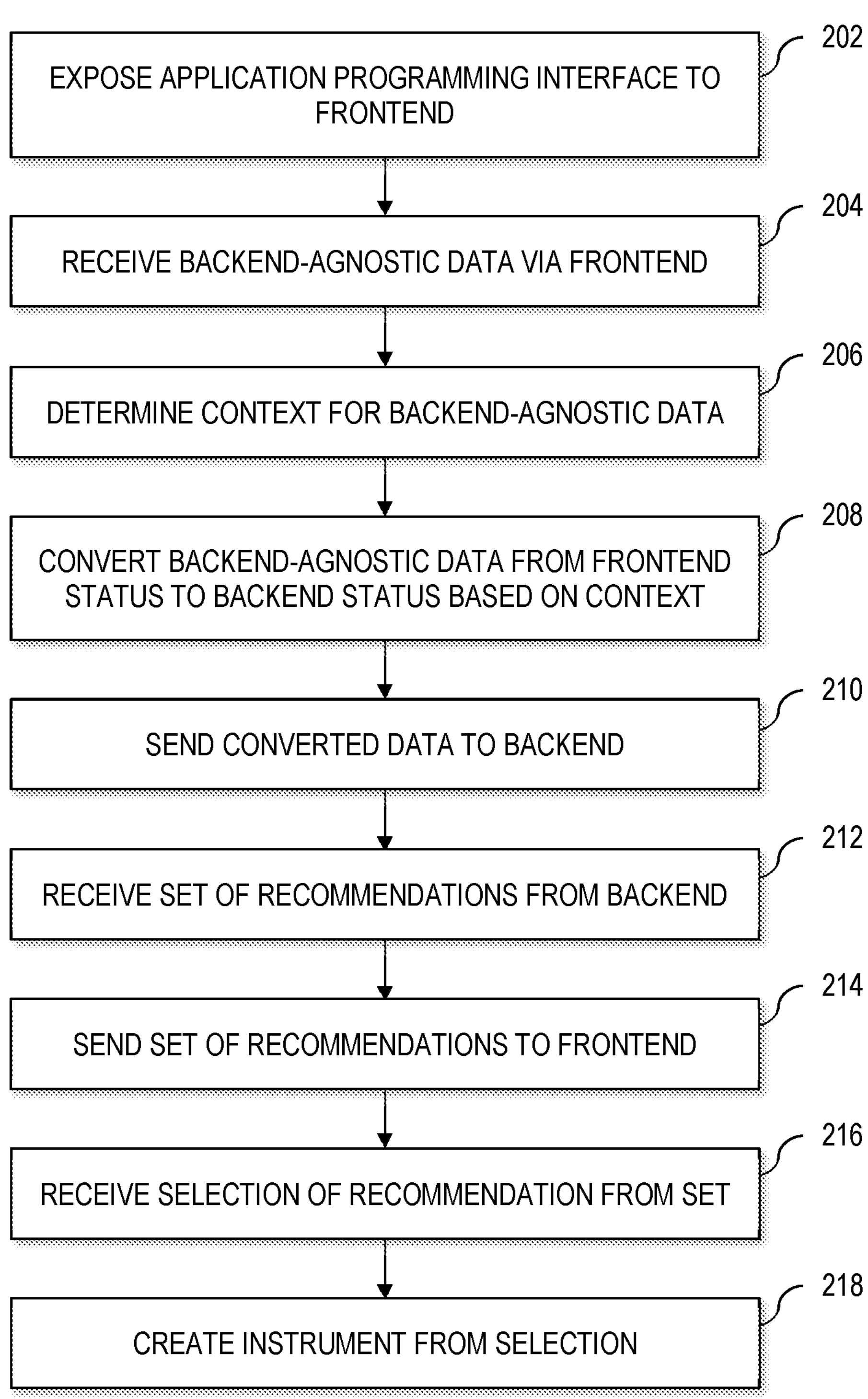
FIG. 2 is a flow chart for a process for converting backend-agnostic data, according to aspects of the present disclosure.

Turning now to FIG. 2, a process 200 is shown for an intermediary to convert backend-agnostic data to data that a backend can understand (i.e., convert the data to a backend status). The process 200 can be implemented with a processor (or multiple processors) coupled to memory (or multiple memories) as discussed below.

At 202, the intermediary exposes an API (application programming interface) to a frontend. The API exposed may be one or more exposed APIs to accommodate multiple and different applications running on the frontend. The exposed API may be in any desired form (e.g., REST).

At 204, the intermediary receives backend-agnostic data from frontend applications. Some frontend applications may send data as a single payload, while others send the data as portions of a piecemeal transmission. Further, some frontend applications may send the data as either a single payload or as a piecemeal transmission, depending on circumstances. As discussed above, the data received is data independent of any backend applications (i.e., the data is backend-agnostic data). The backend-agnostic data may include data to update or manage data (e.g., an insurance policy), data to create a new instrument, etc.

At 206, the intermediary determines a context for the backend-agnostic data. For example, the backend-agnostic data may include the context in a header as metadata, as part of a parameter, or within the data payload itself. Further, the intermediary may be able to determine a context from another parameter or from the application itself. For example, if the intermediary knows that all data from a certain application will always be a portion of a piecemeal transmission, then the intermediary can determine the context (or at least a portion of the context) from the frontend application that sent the data. The context may include more than one type of context. For example, the context may indicate the type of transmission (e.g., single payload, piecemeal, etc.), a sender of the data (e.g., an agent, a user/customer, dealer (i.e., private label), etc.), a range for values of parameters, etc.

At 208, the intermediary converts the backend-agnostic data from a frontend status to a backend status based on the context. For example, if the context indicates that the sender of the frontend application is an agent, then the backend-agnostic data received from the frontend application is converted to backend status based on the sender being an agent. Further, if the backend 106 requires certain parameters to have data in a certain range or to be populated with a value (e.g., numeric, a string, etc.), then the context can be used to supply default values for those parameters (i.e., data values can be assigned to empty attributes). In the following example, the backend 106 requires that there be a maximum value for an insurance policy coverage to be $100,000 in a particular state or jurisdiction. If the context indicates that a is not an agent, and if this coverage value is missing, the intermediary 104 could assign a default value of $50,000 if there is no requested value for coverage amount. If context indicated that the sender is an agent, the intermediary 104 could default to an initial value of $75,000 (i.e., higher than the non-agent default value but less than the maximum value), because the agent has performed another task such as requesting underwriting that takes into account based on loss control, inspection or other favorable risk characteristics. Further, if the context indicates that the sender is not an agent and if the coverage is initially requested at $125,000 which exceeds the maximum value allowed for that coverage value in a particular state or jurisdiction, the intermediary 104 will correct it to a maximum of $100,000 value thereby increasing fault tolerance of the system interaction and providing a successful insurance quote with premium and no error. If a requested value is changed, then an explanation may be provided to the sender as to why the requested value was changed. The intermediary can include default values locally or can obtain them from third-party sources (e.g., a third-party database).

As another example, if the context indicates that the backend-agnostic data from the frontend application is a portion of a piecemeal transmission, then the intermediary may convert the data to backend status by saving the data locally until a larger portion or all of the piecemeal transmission is received and then sending the larger/complete piecemeal transmission to the backend. The portions of the piecemeal transmission may be received in any order, and the intermediary can order the data properly for the backend during conversion. On the other hand, if the context indicates that the backend-agnostic data is a complete transmission (i.e., a single data payload), then that single data payload is passed to the backend.

Further, the For example, the backend 106 requires that there be a minimum value be $55,000 in a particular state or jurisdiction, and if a user (a non-agent user) requests $40,000, then the value will be overridden with the default ($55,000 in this case) for the user to preview when converting the data to backend status. As discussed above, if a certain value is not available in a state or jurisdiction, then if the user chooses that value, then a next best offering will be presented to the user for review.

As with the missing data, default data values for values that are determined to be out of range may be supplied by the intermediary directly, the backend, third-party database(s), or combinations thereof.

Moreover, the intermediary can determine if supplied values are within a certain range when there is no default value. For example if the intermediary knows that the backend will not accept an age for a vehicle over thirty years when the sender is a non-agent, but will accept over thirty years when the sender is an agent, then if the context indicates that the sender is a non-agent and the vehicle-age parameter value is thirty-seven years, then the intermediary may indicate that the parameter value is out of range to the frontend application. In such an instance, the intermediary can then refuse to send data on to the backend to help limit processing of the backend (see below).

Once the data is converted to a backend status, the intermediary sends the converted data to the backed at 210. At 212, the intermediary receives a set of recommendations from the backend. In an insurance example, the set of recommendations may be policies for the sender to choose from or an existing policy for the sender. The set of recommendations may be one or more items.

At 214, the intermediary sends the set of recommendations to the frontend application. The set of recommendations may be the full set received from the backend or may be a subset of the set of recommendations received from the backed.

At 216, the intermediary receives a selection of at least one of the recommendations from the set. At 218, the intermediary creates an instrument based on the selection, the context, and the data received from the frontend. The intermediary uses the converted data, the backend-agnostic data, or both to create the instrument. In some embodiments, the intermediary creates the instrument directly, while in other embodiments, the intermediary creates the instrument indirectly through the backend or a third party.

The intermediary converts and processes data to help streamline transactions through the frontend and backend and offloads some processing from both frontend and backend applications. Thus, the intermediary helps improve processing times for the backed and helps improve compatibility with the frontend, among other things.

Figure 3:
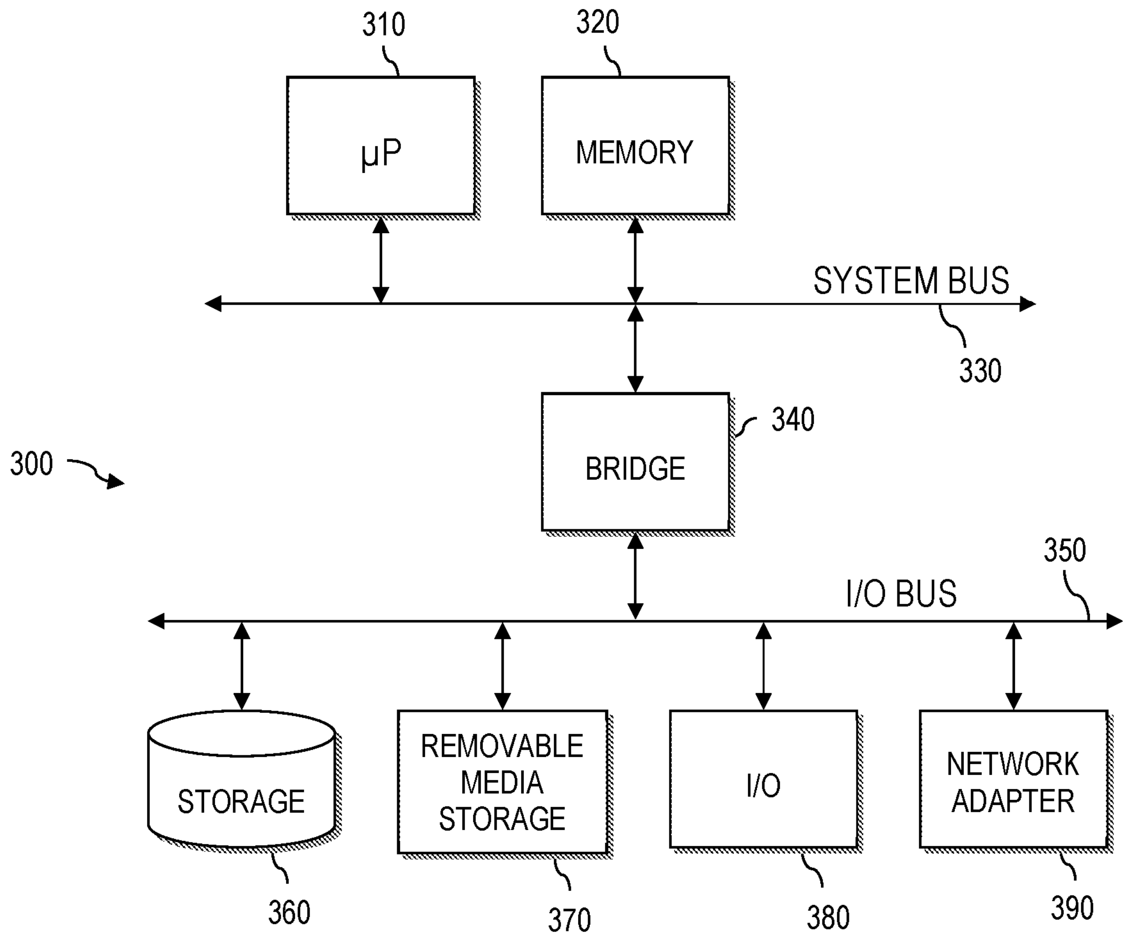
FIG. 3 is a block diagram for a computer system that may run the process of FIG. 2, according to aspects of the present disclosure.

Referring to FIG. 3, a block diagram of a hardware data processing system is depicted in accordance with the present disclosure. Data processing system 300 may comprise a symmetric multiprocessor (SMP) system or other configuration including a plurality of processors 310 and local memory 320, each connected to system bus 330. Alternatively, a single processor 310 may be employed. An I/O bus bridge 340 interfaces the system bus 320 to an I/O bus 350. The I/O bus 350 is utilized to support one or more buses and corresponding devices, such as storage 360, removable media storage 370, input/output devices 380, network adapters 390, other devices, combinations thereof, etc. For instance, a network adapter 390 can be used to enable the data processing system 300 to communicate with other data processing systems or remote printers or storage devices through intervening private or public networks.

The memory 320, storage 360, removable media storage 370, or combinations thereof can be used to store program code that is executed by the processor(s) 310 to implement any aspect of the present disclosure described and illustrated in the preceding FIGURES.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for converting backend-agnostic data, the process comprising:

exposing an application programming interface to a frontend;

receiving backend-agnostic data via the frontend;

determining a context for the backend-agnostic data, wherein the context includes an indication of whether the sender is an agent or not;

converting the backend-agnostic data from frontend status to backend status based on the context, by:

determining that a parameter includes associated data from the data received from the frontend that is within an acceptable range, wherein the range is associated with whether the sender is an agent or not; and converting the data to backend status that a backend can understand based on acceptable parameter values, including:

determining whether the sender has performed a task; and modifying the converted data to be within the acceptable range and sending the modified converted data to the backend if the sender has performed the task;

sending the converted data to the backend if the converted data is within an acceptable range of the backend;
refusing to send the converted data to the backend if the converted data is not within the acceptable range;
receiving a set of recommendations from the backend;
sending the set of recommendations to the frontend;
receiving a selection of a recommendation from the set of recommendations; and
creating an instrument from the selection.

2. The process of claim 1, wherein determining the context for the backend-agnostic data comprises determining the context from a parameter of a header associated with the backend-agnostic data.

3. The process of claim 1, wherein determining the context for the backend-agnostic data comprises determining the context from the backend-agnostic data.

4. The process of claim 1, wherein:
determining the context for the backend-agnostic data comprises determining that a sender associated with the backend-agnostic data is an agent; and
converting the backend-agnostic data from frontend status to backend status based on the context comprises converting the backend-agnostic data using parameters associated with the agent.

5. The process of claim 1, wherein:
determining the context for the backend-agnostic data comprises determining that a sender associated with the data is a user; and
converting the backend-agnostic data from frontend status to backend status based on the context comprises converting the backend-agnostic data using parameters associated with the user.

6. The process of claim 1, wherein:
determining the context for the backend-agnostic data comprises determining that the backend-agnostic data is a portion of a piecemeal transmission; and
converting the backend-agnostic data from frontend status to backend status based on the context comprises saving the part of the piecemeal transmission for sending to the backend.

7. The process of claim 1, wherein determining a context for the backend-agnostic data comprises determining that the backend-agnostic data is a single data payload from the frontend.

8. The process of claim 1, wherein converting data from frontend status to backend status based on the context comprises:
determining that a required parameter includes no associated data from the data received from the frontend; and
determining default data for the required parameter, wherein the default data is based on the context.

9. The process of claim 8, wherein determining default data for the required parameter comprises:
sending a request for the default data from a third-party device, wherein the request includes the context; and
receiving the default data from the third-party device, wherein the received default data is based on the context.

10. The process of claim 1, wherein converting data from frontend status to backend status based on the context comprises:
determining that a required parameter includes associated data from the data received from the frontend that is out of an acceptable range; and
determining default data for the required parameter.

11. The process of claim 10, wherein determining default data for the required parameter comprises:
sending a request for the default data from a third-party device, wherein the request includes the context; and
receiving the default data from the third-party device, wherein the received default data is based on the context.

12. The process of claim 1, wherein creating the instrument further comprises creating the instrument from the converted data.

13. The process of claim 1, wherein creating the instrument further comprises creating the instrument from the backend-agnostic data.

14. The process of claim 1, wherein creating the instrument further comprises creating the instrument directly.

15. The process of claim 1, wherein creating the instrument further comprises creating the instrument indirectly by the backend.

16. The process of claim 1, wherein creating the instrument further comprises creating the instrument indirectly by a third party.

17. A system for converting backend-agnostic data, the system comprising:
memory including instructions; and
a processor coupled to the memory, wherein the instructions instruct the processor to perform:
exposing an application programming interface to a frontend;
receiving backend-agnostic data via the frontend;
determining a context for the backend-agnostic data, wherein the context includes an indication of whether the sender is an agent or not;
converting the backend-agnostic data from frontend status to backend status based on the context, by:
determining that a parameter includes associated data from the data received from the frontend that is within an acceptable range, wherein the range is associated with whether the sender is an agent or not; and
converting the data to backend status that a backend can understand based on acceptable parameter values, including:
determining whether the sender has performed a task; and
modifying the converted data to be within the acceptable range and sending the modified converted data to the backend if the sender has performed the task;
sending the converted data to the backend if the converted data is within an acceptable range of the backend;
refusing to send the converted data to the backend if the converted data is not within the acceptable range;
receiving a set of recommendations from the backend;
sending the set of recommendations to the frontend;
receiving a selection of a recommendation from the set of recommendations; and
creating an instrument from the selection.

18. The system of claim 17, wherein the instructions for determining the context for the backend-agnostic data comprise instructions for determining the context from a parameter of a header associated with the backend-agnostic data.

19. The system of claim 17, wherein the instructions for:
determining the context for the backend-agnostic data comprise instructions for determining that the backend-agnostic data is a portion of a piecemeal transmission; and converting the backend-agnostic data from frontend status to backend status based on the context comprise instructions for saving the part of the piecemeal transmission for sending to the backend.

20. The system of claim 17, wherein the instructions for determining the context for the backend-agnostic data comprise instructions for determining that the backend-agnostic data is a single data payload from the frontend.

* * * * *